(12) United States Patent
Richter et al.

(10) Patent No.: US 10,016,709 B2
(45) Date of Patent: Jul. 10, 2018

(54) PIPELINE STRAINER WITH CLEANING TOOL

(71) Applicant: The Metraflex Company, Chicago, IL (US)

(72) Inventors: James R. Richter, Lincolnshire, IL (US); Daniel T. Holbach, Palatine, IL (US); James Orrico, Evanston, IL (US); Daniel R. Kish, Chicago, IL (US); Brady Richter, Lincolnshire, IL (US)

(73) Assignee: The Metraflex Company, Chicago, IL (US)

( * ) Notice: Subject to any disclaimer, the term of this patent is extended or adjusted under 35 U.S.C. 154(b) by 190 days.

(21) Appl. No.: 15/130,390

(22) Filed: Apr. 15, 2016

(65) Prior Publication Data

US 2017/0296948 A1    Oct. 19, 2017

(51) Int. Cl.
*B01D 35/02* (2006.01)
*B01D 35/16* (2006.01)
*F16L 55/124* (2006.01)

(52) U.S. Cl.
CPC ............. *B01D 35/16* (2013.01); *B01D 35/02* (2013.01); *F16L 55/124* (2013.01)

(58) Field of Classification Search
None
See application file for complete search history.

(56) References Cited

U.S. PATENT DOCUMENTS

| 1,692,852 | A | * | 11/1928 | Morris | B01D 29/15 210/385 |
| 2,792,120 | A | | 5/1957 | Tinker | |
| 2,979,209 | A | | 4/1961 | Nolden | |
| 3,497,452 | A | * | 2/1970 | Arvanitakis | B01D 27/02 210/167.31 |
| 4,582,605 | A | | 4/1986 | Rea et al. | |
| 5,718,822 | A | | 2/1998 | Richter | |
| 2005/0023196 | A1 | * | 2/2005 | Ku | B01D 35/02 210/90 |
| 2010/0116732 | A1 | | 5/2010 | Jung | |
| 2014/0027357 | A1 | | 1/2014 | Morris | |

FOREIGN PATENT DOCUMENTS

| CN | 202223967 | | 5/2012 |
| CN | 203170086 | | 9/2013 |
| CN | 205683678 U | * | 11/2016 |
| JP | 07-305240 | * | 11/1995 |

* cited by examiner

*Primary Examiner* — Chester T Barry
(74) *Attorney, Agent, or Firm* — Greer, Burns & Crain, Ltd.

(57) ABSTRACT

A pipeline strainer having a body with a straining element therein. A cleaning tool is disposed in the body to dislodge debris from the straining element. The debris may be removed from the body through a debris drain. The cleaning tool comprises a portion within the body and a portion outside of the body. A handle may comprise the portion outside of the body.

15 Claims, 9 Drawing Sheets

PIPELINE STRAINER WITH CLEANING TOOL

FIELD OF THE INVENTION

The present invention relates to a pipeline strainer which includes a cleaning tool which may be utilized to dislodge debris from a straining element disposed inside of the pipeline strainer.

BACKGROUND OF THE INVENTION

Pipeline strainers are used for protecting pumps, compressors, turbines, meters, automatic valves, sprinkler heads, nozzles, steam traps, heat exchangers, meters, and other pipeline equipment.

Two common designs for pipeline strainers are the Y-shaped pipeline strainers (see, e.g., FIG. 3 of U.S. Pat. No. 5,718,822) and the basket pipeline strainer (see, e.g., FIG. 4 of U.S. Pat. No. 5,718,822). Most basket pipeline strainers are intended for horizontal or slightly inclined piping. On the other hand, the Y-shaped pipeline strainers, as well as some T-shaped basket strainers, can be used in horizontal, as well as vertical (downward), piping. In the Y-shaped pipeline strainers, a debris collection chamber, which houses a straining element, is disposed obliquely to the flow path of the fluid thorough the pipeline strainer.

In both types of designs for pipeline strainers, the pipeline strainers remove solids from a flowing fluid with a perforated, mesh, or wedge wire straining element. The solids are retained in the straining element, allowing the fluids to flow therethrough and to the downstream equipment. After a certain period of time, a drain in the pipeline strainer can be opened to remove the debris in order to avoid excess pressure drop associated with the collection of solids in the straining element. This debris may have become lodged in the straining element, and may not easily be removed. Accordingly, it may be necessary to remove the entire straining element to clean and remove all of the debris therefrom. As will be appreciated, this may be a more time consuming process compared with merely opening a debris drain in the pipeline strainer to allow debris to be removed.

It has been suggested that a pipeline strainer include an integral cleaning tool that is rotated by the flow of fluid through the pipeline strainer. As fluid is passed through the pipeline strainer, the fluid passes an impeller, causing the impeller to rotate. The rotation of the impeller causes a brush on an axle to revolve around the axel. The brush is disposed inside of the straining element and is intended to dislodge materials and debris therein.

While presumably effective for its intended purpose, such a device is only able to be used when fluid is flowing through the pipeline strainer. If there is no fluid moving through the pipeline strainer, the cleaning tool cannot be used to dislodge debris. Thus, in order to be cleaned when there is no fluid, the entire straining element must be removed. Additionally, a device which is driven by the flow of fluid can increase the pressure drop of the fluid passing through the pipeline strainer by impeding the flow path of the fluid with, for example, the impeller.

Therefore, it would be desirable to provide a pipeline strainer that includes an integral cleaning tool which can be utilized both when fluid is passing through the pipeline strainer and when no fluid is passing through the pipeline strainer.

It may further be desirable to provide a pipeline strainer that includes an integral cleaning tool which does not significantly increase the pressure drop of the fluid passed through the pipeline strainer.

SUMMARY OF THE INVENTION

A new pipeline strainer has been invented which includes a cleaning tool disposed inside of a body that can be used to dislodge debris from an internal straining element. The cleaning tool includes a portion outside of the body of the pipeline strainer and a second portion inside of the body of the pipeline strainer. This allows the cleaning tool to be utilized both during operation of the pipeline strainer (when fluid is flowing therethrough) and during periods when the pipeline strainer is offline (when no fluid is flowing therethrough). These and other benefits will be appreciated in the following summary and detailed description.

According to a first aspect of the present invention, the present invention provides a pipeline strainer comprising a body, a straining element, and a cleaning tool. The body comprises an inlet for a fluid, an outlet for the fluid, a cavity inside of the body connecting the inlet and the outlet, a debris drain, and a longitudinal axis of the body extending from the inlet to the outlet. The straining element is disposed in the cavity and includes a first end, a second end opposite the first end, and a longitudinal axis extending from the first end to the second end. The cleaning tool comprises an inner portion within the body and an outer portion outside of the body. The cleaning tool further comprises at least one cleaning implement disposed inside of the cavity and coupled to an axle. The at least one cleaning implement is configured to dislodge debris from an interior surface of the straining element.

In one or more embodiments of a pipeline strainer according to the various aspects of the present invention, the cleaning tool further comprises a handle connected to the axle. The handle is preferably configured to rotate the axle. The at least one cleaning implement may be mounted on an arm, and the arm may be connected to the axle. The pipeline strainer may include a plurality of cleaning implements and each cleaning implement may be configured to dislodge debris from the straining element. Each cleaning implement may be mounted on an arm, and each may be connected to the axle. The axle may be coaxial with the longitudinal axis of the straining element.

In one or more embodiments of a pipeline strainer according to the various aspects of the present invention, the pipeline strainer further comprises a seal disposed on a side of the body. The axle preferably extends through the seal and out of the body. The seal may include a biased member configured to bias the cleaning tool in a direction parallel with the longitudinal axis of the straining element.

According to a second aspect of the present invention, the present invention provides a pipeline strainer comprising a body, a straining element, and a rotatable cleaning tool. The body may comprise an inlet for a fluid, an outlet for the fluid, a cavity inside of the body connecting the inlet and the outlet, a debris drain, and a longitudinal axis of the body extending from the inlet to the outlet. The straining element is disposed in the cavity and includes a first end, a second end opposite the first end, and a longitudinal axis extending from the first end to the second end. The rotatable cleaning tool comprises a handle disposed outside of the body and at least one cleaning implement disposed inside of the cavity.

The rotatable cleaning tool is configured to be moved by the handle and to dislodge debris from an interior surface of the straining element.

In one or more embodiments of a pipeline strainer according to the various aspects of the present invention, the at least one cleaning implement is mounted on an arm, and wherein the arm is connected to an axle.

In one or more embodiments of a pipeline strainer according to the various aspects of the present invention, the pipeline strainer further comprises a plurality of cleaning implements disposed inside of the cavity. Each cleaning implement may be configured to dislodge debris from the straining element. Each cleaning implement may be mounted on an arm, and the arms may be connected to an axle. The pipeline strainer may further comprise a seal disposed on a side of the body. The axle may extend through the seal and out of the body. The seal may include a biased member configured to bias the cleaning tool in a direction along the longitudinal axis of the straining element.

According to a first aspect of the present invention, the present invention provides a pipeline strainer comprising a body, a straining element, and a rotatable cleaning tool. The body comprises an inlet for a fluid, an outlet for the fluid, a cavity inside of the body connecting the inlet and the outlet, a debris drain, and a longitudinal axis of the body extending from the inlet to the outlet. The straining element is disposed in the cavity and includes a first end, a second end opposite the first end, and a longitudinal axis extending from the first end to the second end. The rotatable cleaning tool comprises a handle disposed outside of the body and a plurality of one cleaning implements disposed inside of the cavity. Each cleaning implement may be configured to dislodge debris from an interior surface of the straining element and each cleaning implement is connected to an arm, and the arms are connected to an axle movable by the handle.

In one or more embodiments of a pipeline strainer according to the various aspects of the present invention, an angle between the longitudinal axis of the body and the longitudinal axis of the straining element is between 0 and 60°.

In one or more embodiments of a pipeline strainer according to the various aspects of the present invention, the second end of the straining element is disposed proximate the debris drain. The axle may be coaxial with the longitudinal axis of the straining element and the debris drain may be eccentric with the longitudinal axis of the straining element. The pipeline strainer may further comprise a seal disposed on a side of the body. The axle may extend through the seal and out of the body. The seal may include a biased member configured to bias the cleaning tool in a direction along the longitudinal axis of the straining element.

These and other aspects and embodiments of the present invention will be appreciated by those of ordinary skill in the art based upon the following description of the drawings and detailed description of the preferred embodiments.

BRIEF DESCRIPTION OF THE DRAWINGS

The attached figures in the drawings will make it possible to understand how the invention can be produced. In these figures, similar reference numbers denote similar elements.

DETAILED DESCRIPTION OF THE PREFERRED EMBODIMENTS

As mentioned above, a new pipeline strainer has been invented which includes a cleaning tool disposed inside of a body that can be used to dislodge debris from an internal straining element both during operation of the pipeline strainer and during periods when the pipeline strainer is offline and not in use. Unlike conventional designs, the cleaning tool includes an inner portion within the body and an outer portion outside of the body. This allows the cleaning tool to dislodge debris in the straining element regardless of whether the pipeline strainer is in use or if it is offline. It is believed that such a design will reduce the amount of time needed to clean the pipeline strainer to remove debris.

Accordingly, with reference the attached drawings, one or more embodiments of the present invention will now be described with the understanding that the described embodiments are merely preferred and are not intended to be limiting.

Figure 1:
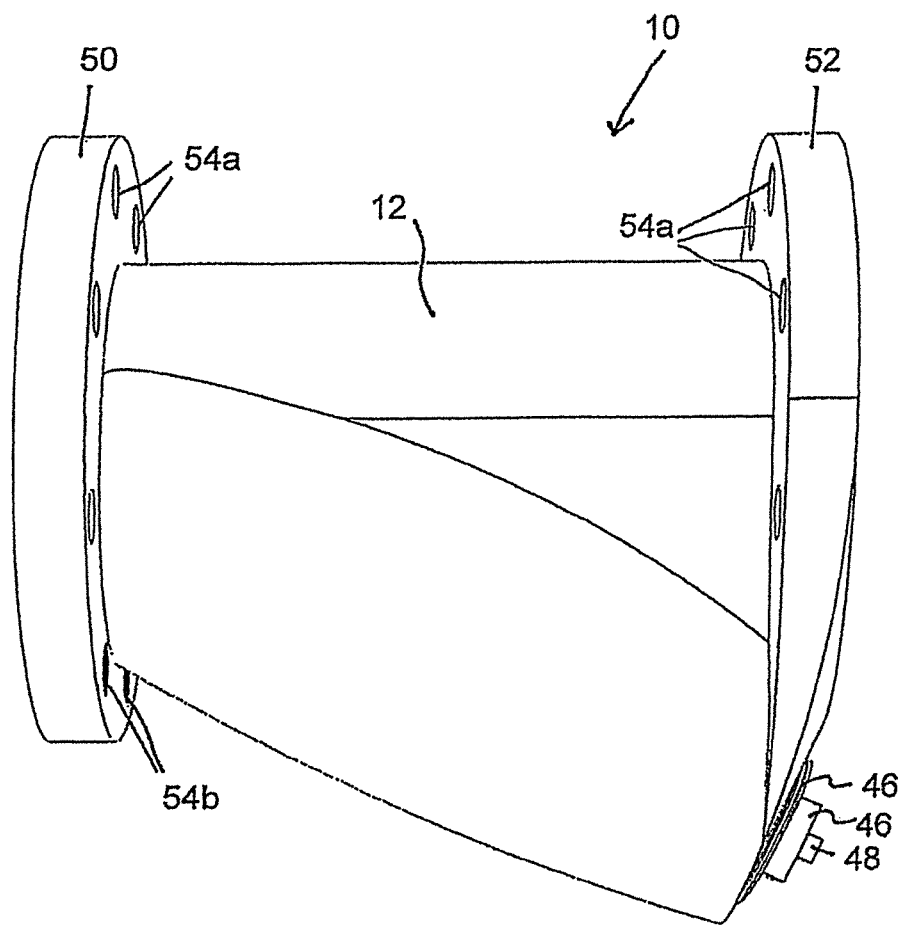
FIG. 1 is a side perspective view of a pipeline strainer according to one or more embodiments of the present invention.

With reference to FIG. 1, a pipeline strainer 10 according to one or more embodiments of the present invention comprises a body 12. The body 12 can be made from a variety of appropriate materials, including, for example, iron, carbon steel, carbon moly, stainless steel, chrome moly, aluminum, bronze, monel, nickel, HASTELLOY® B, HASTELLOY® C, titanium, and plastic.

Figure 2:
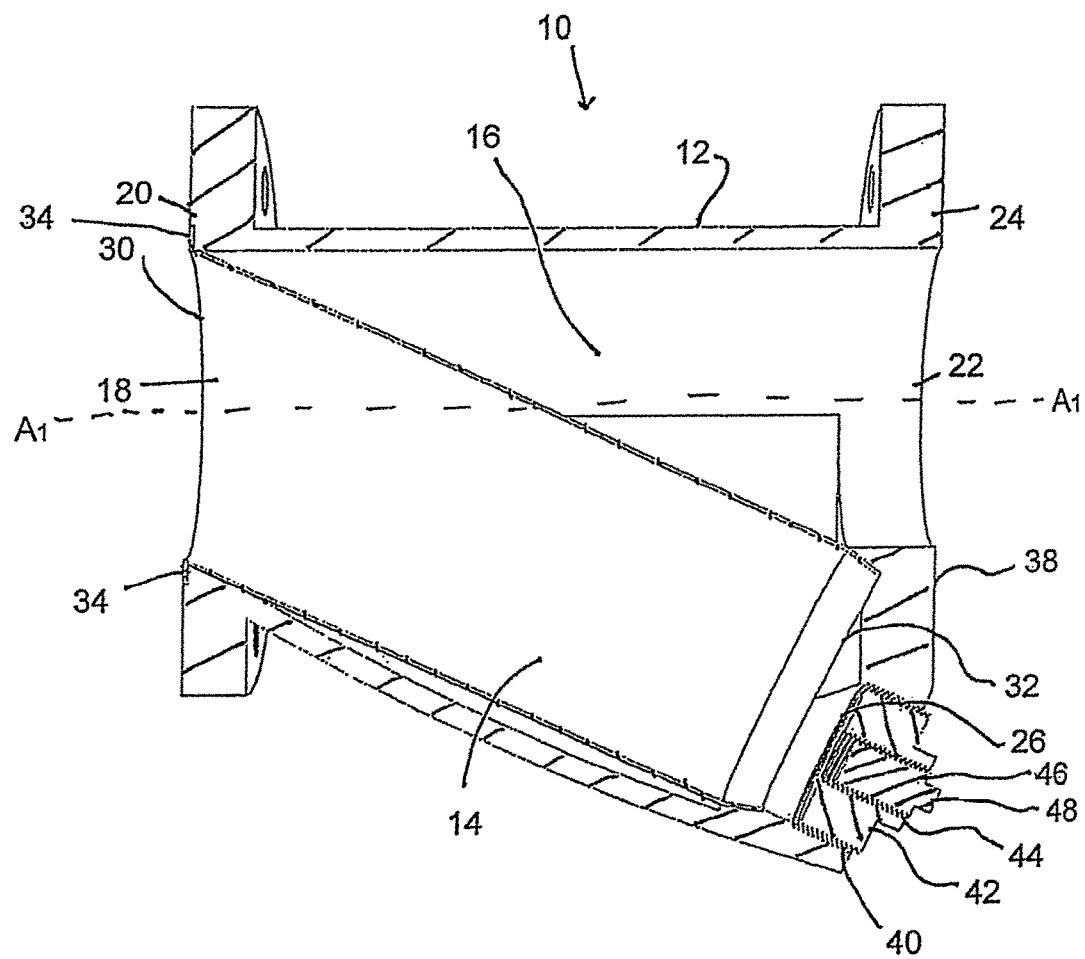
FIG. 2 is a cutaway side perspective view of a pipeline strainer according to one or more embodiments of the present invention with a baffle and an air valve.
Figure 3:
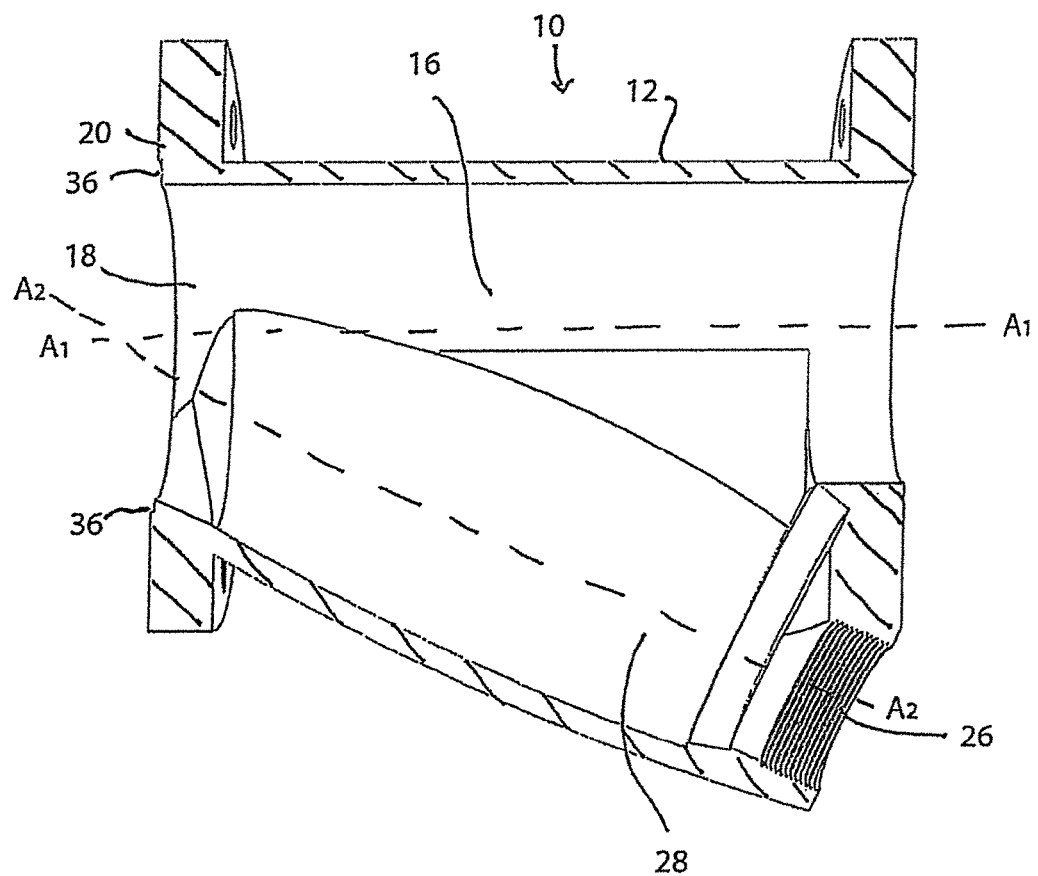
FIG. 3 is a cutaway side perspective view of a pipeline strainer according to one or more embodiments of the present invention with a baffle.

Turning to FIG. 2, the pipeline strainer 10 also includes a straining element 14. The body 12 also includes a cavity 16 disposed inside of the body 12 which houses at least a portion of the straining element 14. The body 12 includes an inlet 18 to the cavity 16 for a fluid disposed at a first end 20 of the body 12. An outlet 22 from the cavity 16 for the fluid is disposed at a second end 24 of the body 12. The inlet 18 and outlet 22 of the body 12 are both generally disposed along an axis $A_1$. As can be seen best in FIG. 3, the body 12 also includes a debris drain 26 that is disposed in a portion of the cavity 16 that comprises a debris collection chamber 28 that houses the straining element 14.

Returning to FIG. 2, the straining element 14 is disposed in the body 12 and removes debris in the fluid passed through the body 12 from the inlet 18 to the outlet 22. An axis $A_3$ of the straining element 14 extends from a first end 30 to a second end 32. Preferably, both the first end 30 and the second end 32 are open. The second end 32 is disposed proximate the debris drain 26 of the body 12, when the straining element 14 is inserted therein. In various embodiments, at least the first end 30 of the straining element 14 is planar and lies in a first plane. The second end 32 of the straining element 14 may also be planar and lie in a second plane. In at least one embodiment, the first plane, which includes the first end 30 of the straining element 14, is disposed obliquely to the longitudinal axis $A_3$ of the straining element 14. The second end 32 of the straining element 14 may be disposed perpendicular to the longitudinal axis $A_3$ of the straining element 14.

Figure 4:
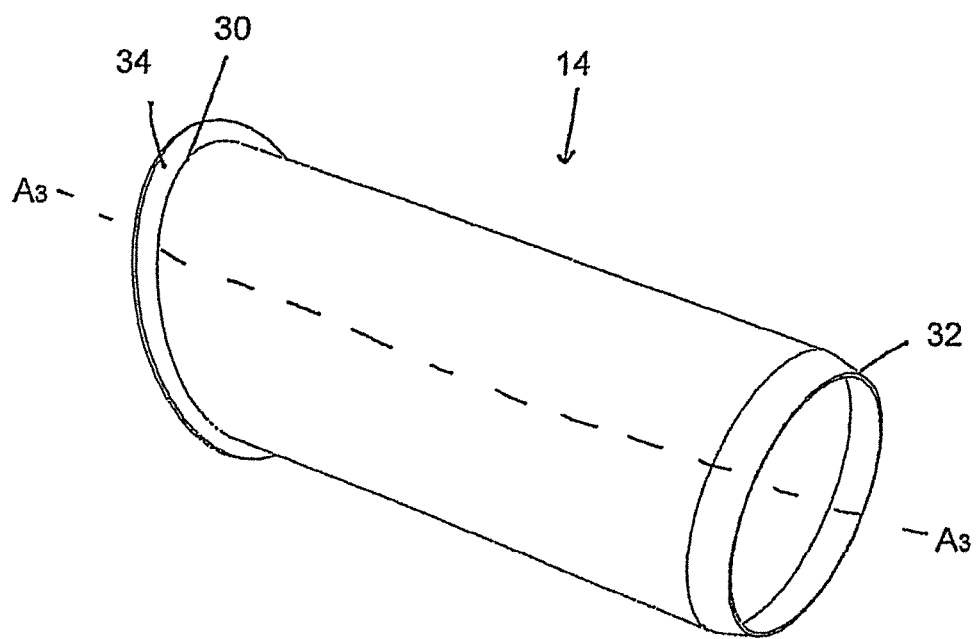
FIG. 4 is a side cutaway view of a portion of a pipeline strainer according to one or more embodiments of the present invention with a baffle.
Figure 5:
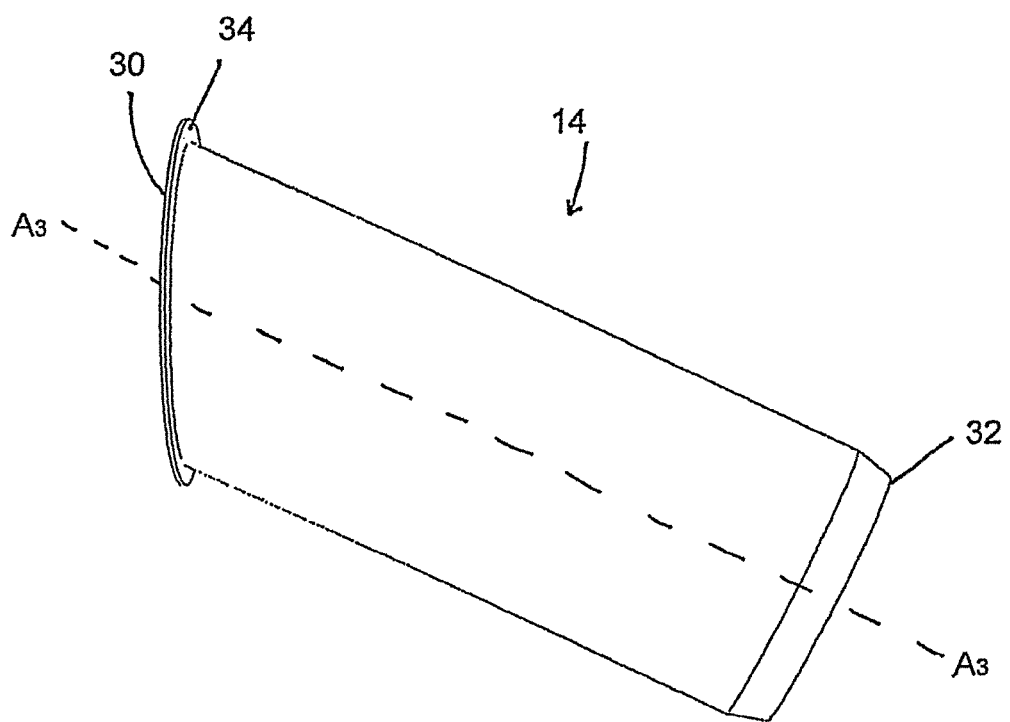
FIG. 5 is a side cutaway view of a portion of a pipeline strainer according to one or more embodiments of the present invention with a baffle.

In the depicted embodiment, the pipeline strainer has a Y-shape in which an angle between the axis $A_1$ of the body 12 and the axis $A_3$ of the straining element 14 is less than 90°. Preferably, the angle is between 30 to 60°, and most preferably, the angle is less than 30° and greater than 9.5°. For example, preferred angles include may be about 22.0°, 22.5°, 23.0°, 23.5°, 24.0°, 24.5°, 25.0°, 25.5°, 26.0°, 26.5°, 27.0°, 27.5°, 28.0° or 28.5°. By the term "about" with respect to the angle between the axis $A_3$ of the straining element 14 and the axis $A_1$ of the body 12, it is intended to mean the stated angle +/−0.3°. Such pipeline strainers are disclosed in U.S. patent application Ser. No. 14/597,634 filed on Jan. 15, 2015, the entirety of which is incorporated herein by reference. However, it is also contemplated that the angle between the axis $A_1$ of the body 12 and the axis $A_3$ of the straining element 14 is 90°—in which the pipeline strainer comprises a basket strainer—such as shown in FIG. 4 of U.S. Pat. No. 5,718,822 (the entirety of which is incorporated herein by reference).

Various materials can be used for the straining element 14 including carbon steel, stainless steel, monel, HASTELLOY® B, HASTELLOY® C, alloy 20, nickel, brass, copper, galvanized steel, INCOLOY®, INCONEL®, titanium, aluminum, and plastic, to name a few. The straining element 14 can also be lined with various coatings to minimize corrosion, such as epoxy, asphalt, polytetrafluoroethylene, vinyl, polychlorotrifluoroethene, rubber, neoprene, baked phenolic, and plating with zinc, cadmium, nickel, galvanizing, etc.

One consideration in the selection of a straining element 14 material is the size of the perforations, mesh or wedge wire opening used in the making of the straining element 14 based upon the size and quantity of particles which can pass through downstream equipment without causing damage to the equipment. The use of smaller holes than those actually required, can lead to too-frequent cleaning, excessive pressure drops, and screens constructed of thinner metal which will withstand less pressure differential. Generally, stainless steel perforated metal may be typically obtained in a thickness which is one gage thickness less than the diameter of the punched holes. Carbon steel and brass can be obtained in approximately the same thickness as the hole diameter. A common way to accomplish fine straining in large straining elements 14 is by mesh lining a larger hole, heavier gage perforated plate.

The capacity ratio, or open area ratio (OAR) of the straining element 14 influences such operating characteristics as the length of time it can operate without cleaning and the created pressure loss. The OAR is the relationship between internal cross sectional area (flow area) of the pipe and the open flow area of the material which makes up the straining element 14.

A straining element 14 with at least 100% OAR, or 1-to-1 ratio, would provide an unrestricted flow area equal to that of the pipe while the element was clean. As clogging occurs, however, flow would provide restricted flow, after the element became 50% clogged. A straining element 14 with a 400% OAR is acceptable for general heating and air conditioning service. Additionally, larger OARs would be appropriate for flow in which much debris is expected to be strained or where very viscous fluids are being handled.

When considering the OAR of a straining element 14, there are two accepted methods of analysis used by various specifying agencies and manufacturers. One method maintains a "line of sight" reasoning and uses the multiple of the open areas for elements in series. In this method, a 60% open area material in series with a 40% open area material has a resultant combined open area of 24% (i.e., as in accordance with military standards).

An alternative method allows the open area of the more restrictive element in series to be used. This would be 40% for the example above (i.e. as in accordance with Underwriter Laboratory Standards). The method used influences the estimated operating pressure drop, as well as design decisions such as sizing.

As an example, fuel oils are generally strained to a fine degree to protect small orifices in burner nozzles. This requires a fine woven mesh be used in series with a reinforcing perforated plate. Due to the fact that the perforated plate may have a 50% open area and the mesh 30%, the resultant combined open area may be considered to be only 15% if there is no flow path other than line of sight through the two element in series. This would require a straining element 14 with an OAR of 250%, which would be considered a high capacity, large bodied straining element 14. However, this same straining element 14 using only the perforated plate would have an OAR more than three times as great. Thus, for a given straining element 14, the OAR may be varied by using various perforations or meshes having different open areas.

Most pump installations designed for reasonable velocities will permit approximately a 2-psi drop across the straining element 14. When the straining element 14 becomes clogged, the pressure drop varies with the clogging pattern experienced and the type of the straining element 14 being used. If large amounts of solids are expected, use a straining element 14 with a high net open area. As a straining element 14 becomes clogged to the point where the OAR of the straining element 14 approaches the pipe area, the pressure drop across the straining element 14 increases very rapidly and unpredictably. It is at this point, therefore, that it is recommended the straining element 14 be cleaned, discussed below, otherwise, a large differential pressure will develop. The maximum differential pressure the straining element 14 can withstand varies widely with the straining element 14 type, line size and material used.

Since the straining element 14 will remove (or retain) particulate material in the fluid, the straining element 14 must be periodically cleaned. According to various embodiments of the present invention, and as shown in FIG. 2 the debris drain 26 may comprise a threaded bore 40 and a plug 42. The plug 42 includes an outer circumferential surface that is threaded to engage the threaded bore 40. The plug 42 may be sized to be smaller than the second end 32 of the straining element 14.

In a most preferred embodiment, the plug 42 also includes a threaded bore 44 there though, and a second plug 46. The second plug 46 includes a threaded outer circumferential surface that is threaded so as to engage the threaded bore 44 of the first plug 42. An end 48 of the second plug 46 may be configured to cooperate with a tool, such as a wrench, ratchet, or other similar tool that can be used to rotate the first plug 42 and the second plug 46. The threaded bores 44 and 40 may be oppositely threaded, i.e., one including a right-handed thread and the other including a left-handed thread, however, this is not required. In some embodiments or when in use, the second plug 46 may be replaced with a valve (not shown), that allows debris collected in the straining element 14 to be drained by merely opening the valve. The plug 42, which is larger, can be removed for a visual inspection of the straining element 14 or to allow for removal of larger debris that cannot pass through the valve (or the threaded bore 44).

The use of the threaded bore 40 and plug 42 will also save time when opening and closing the debris drain 26 compared to prior art designs that comprise an end cap with flanges and a plurality of fasteners used to secure the end cap to the pipeline strainer.

Figure 6:
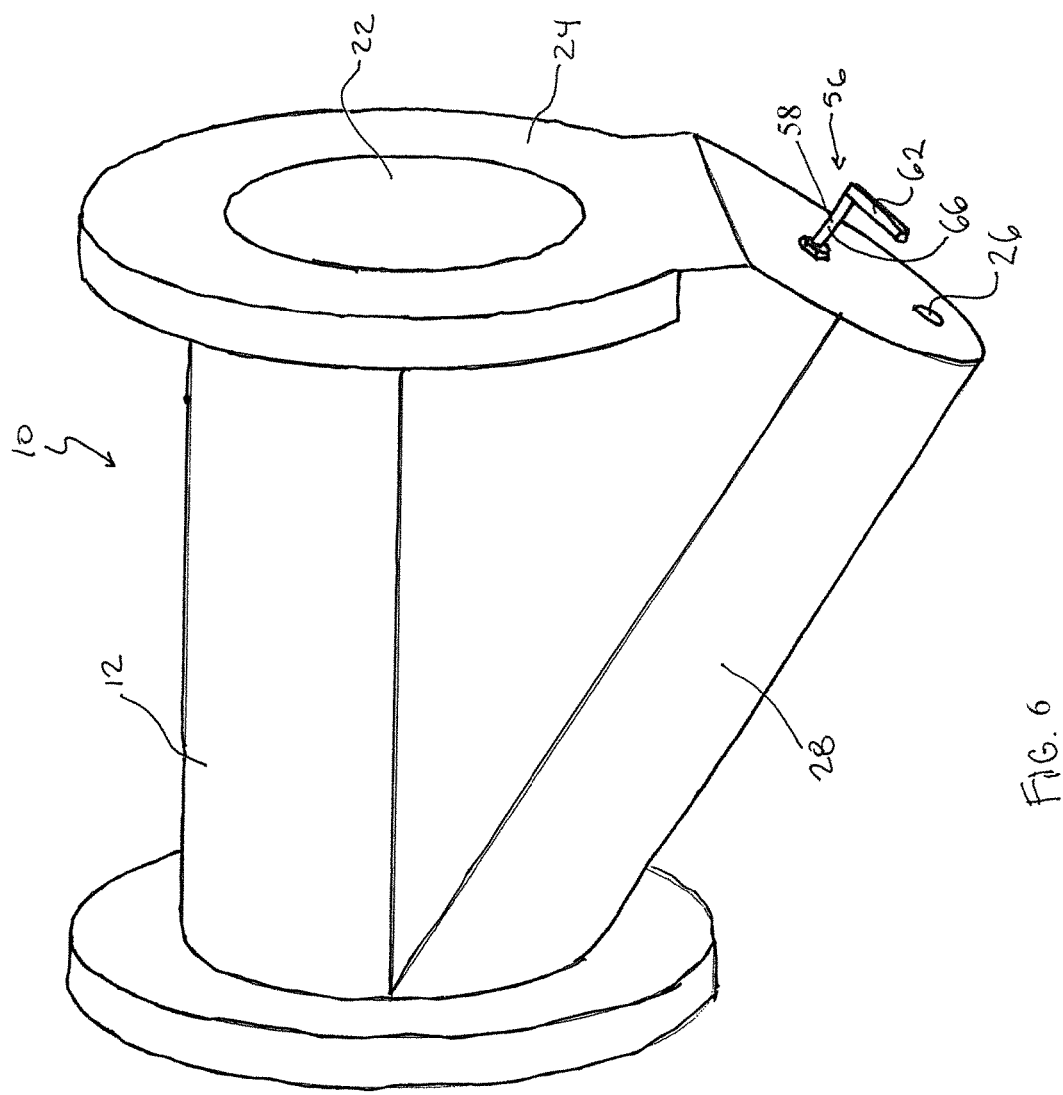
FIG. 6 is a side and end perspective view of a pipeline strainer according to one or more embodiments of the present invention with a cleaning tool.
Figure 7:
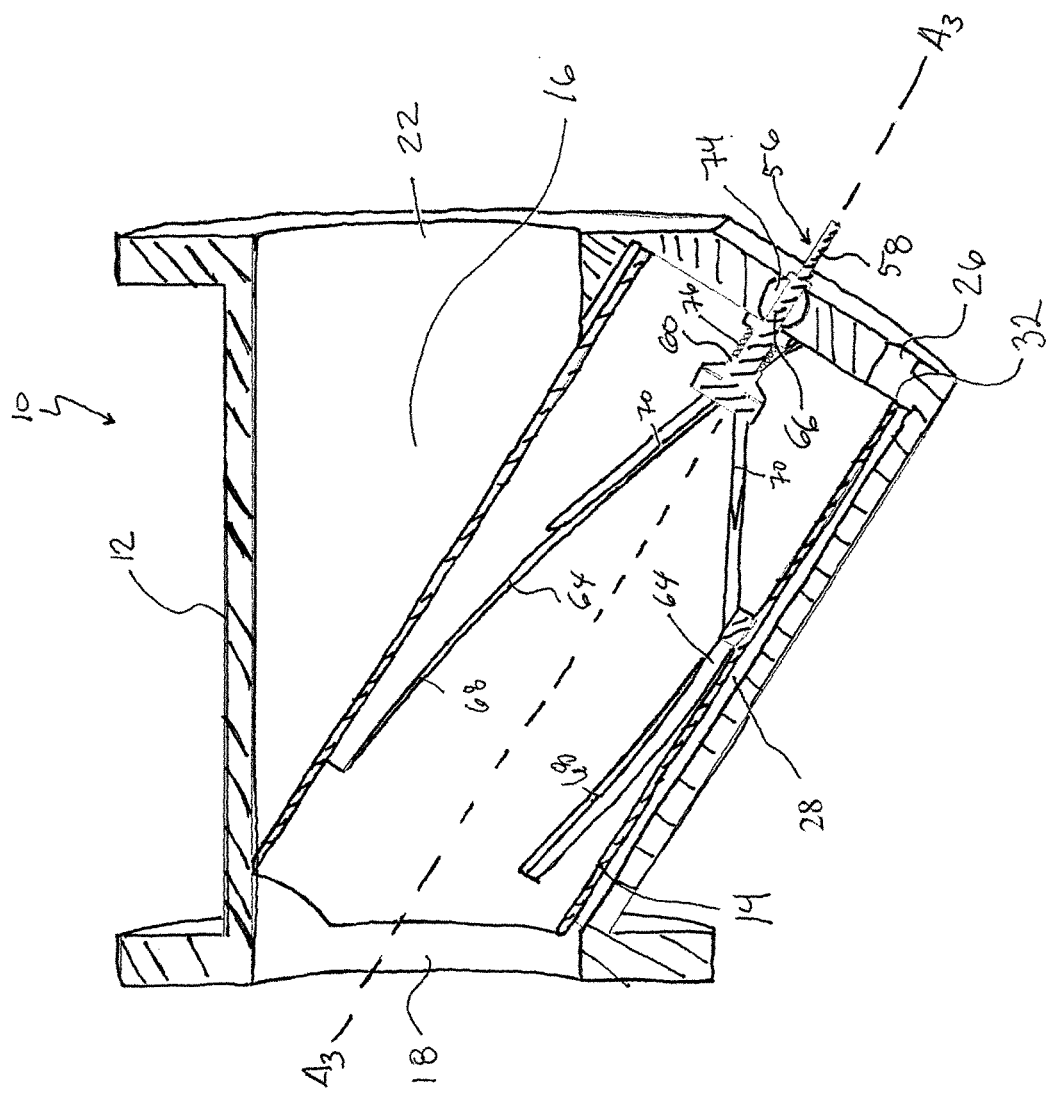
FIG. 7 is a side and end cutaway view of the pipeline strainer and the cleaning tool of FIG. 6.

With reference to FIGS. 6 and 7, in one or more embodiments, the pipeline strainer 10 may further include a cleaning tool 56 that includes an outer portion 58 disposed outside of the body 12 and an inner portion 60 disposed inside of the body 12 and preferably inside of the straining element 14. In a preferred embodiment, the cleaning tool 56 comprises a handle 62 that may comprise the outer portion 58 of the cleaning tool 56. Additionally, it is preferred that the cleaning tool 56 includes one or more cleaning implements 64 that are disposed within the body 12 and which may comprise the inner portion 60 of the cleaning tool 56. The cleaning implements 64 are configured to engage or contact an inner surface of the straining element 14. When moved, the cleaning implements 64 may dislodge materials that may have become stuck to the straining element 14.

The handle 62 is preferably utilized to move the cleaning implements 64 within the body 12, or more specifically within the straining element 14. For example, the handle 62 may be configured to be gripped by a user or connected to a driving tool, like a power drill or the like. Accordingly, the cleaning implements 64 may be coupled to an axle 66 and the axle 66 may be configured to be moved by the handle 62. The axle 66 may be integrally formed with the handle 62, or the axle 66 may be a separate piece that is connected or secured to the handle 62 via other means, known in the art, like glue or a connector.

Figure 8:
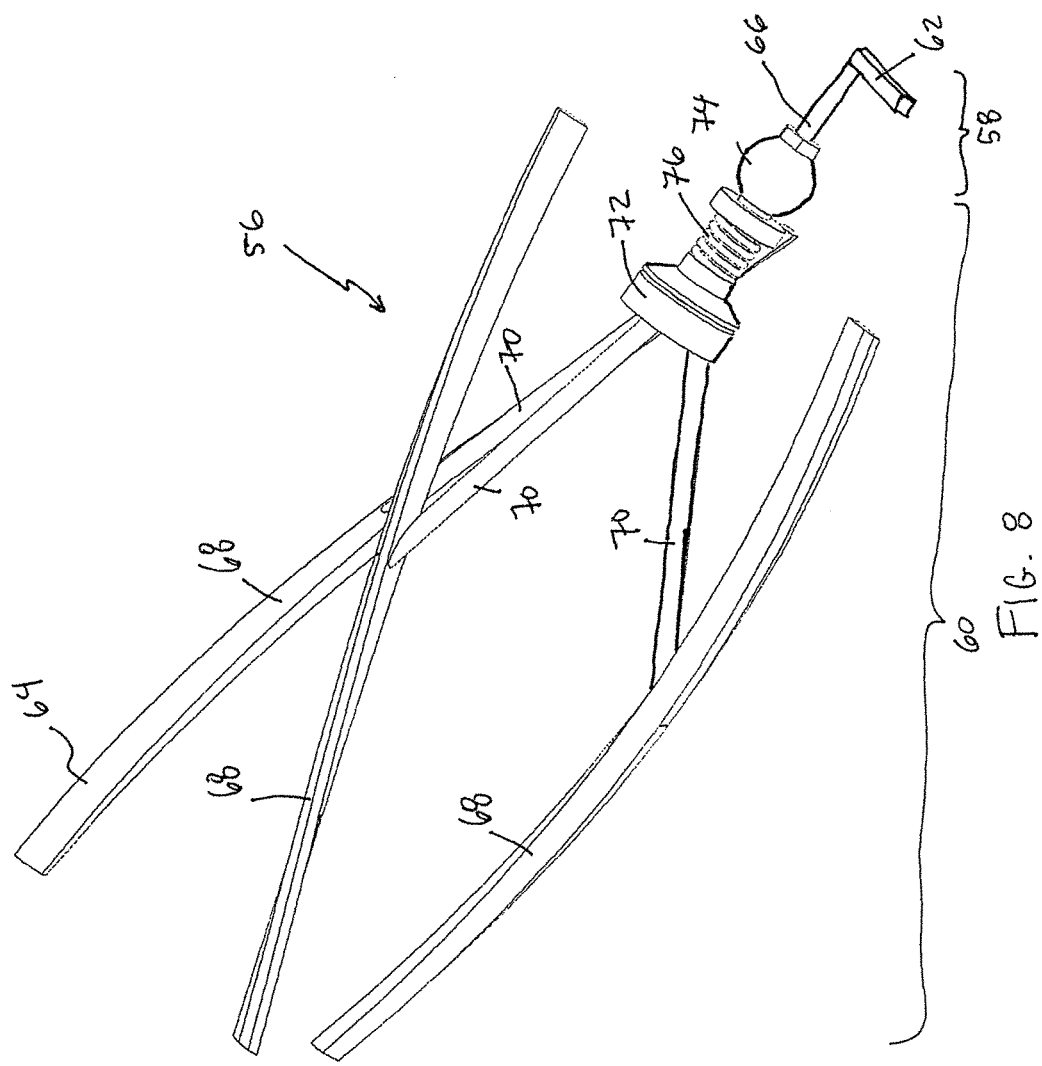
FIG. 8 is a side perspective view of the cleaning tool shown in FIGS. 6 and 7.
Figure 9:
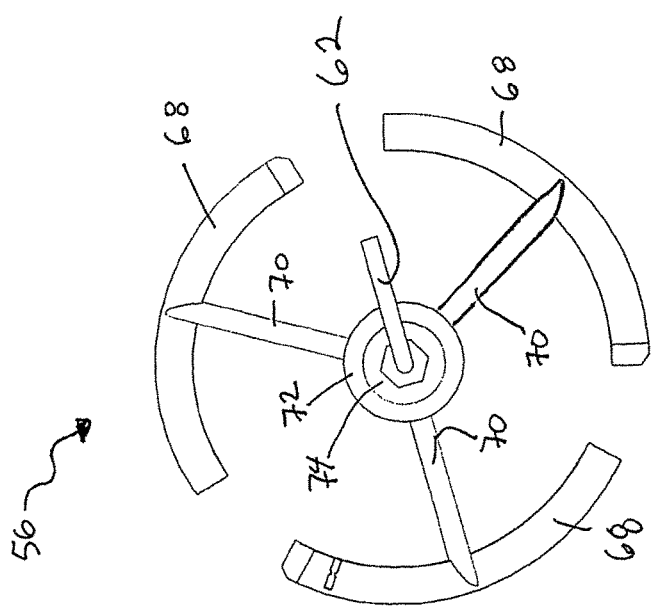
FIG. 9 is an end view of the cleaning tool shown in FIG. 8.

As shown in more detail in FIGS. 8 and 9, in a preferred embodiment, the cleaning tool 56 includes three blades 68 which each comprise a cleaning implement 64. The blades 68 are each connected to an arm 70, with the arms 70 each being connected to a disk 72 that comprises a portion of the axle 66. The disk 72 is configured such that rotation of the handle 62 will be transferred to the disk 72, via the axle 66, which will cause the blades 68 to revolve along an inner surface of the straining element 14 (see FIG. 7) and dislodge or remove debris therefrom. In an alternative design, instead of the blades 68, the cleaning implement(s) 64 may comprise an auger or helix (not shown).

As shown in FIG. 7, the handle 62, the axle 66 or both pass through an end of the debris collection chamber 26, preferably, along the longitudinal axis $A_3$ of the straining element 14. In this manner, the handle 62, the axle 66, or both will include a portion that is coaxial with the straining element 14. It is also contemplated that the debris drain 26 is offset or eccentric with the longitudinal axis $A_3$ of the straining element 14. Preferably, the debris drain is spaced from the longitudinal axis $A_3$ of the straining element 14 and disposed proximate the second end 32 of the straining element 14.

In the depicted embodiment, the outer portion 58 of the cleaning tool 56 may pass through a seal 74 that is disposed in a side of the body 12. For example, the axle 66, the handle 62, or both may extend through the seal 74 and out of the body 12. The seal 74 may also include a biased member 76, such as a spring or the like. See also FIG. 7. The biased member 76 may provide the cleaning tool 56 with some degree of movement in a direction parallel to the longitudinal axis $A_3$ of the straining element 14. This may be advantageous in removing debris from the straining element 14.

The cleaning tool 56 is believed to provide a pipeline strainer 10 that requires less frequent cleanings and maintenance to remove debris. This will allow the pipeline strainer 10 to be in service longer than a pipeline strainer without a cleaning tool 56. Additionally, since the cleaning tool 56 is not rotated by flowing fluid through the pipeline strainer 10, the cleaning tool 56 can be utilized to dislodge debris while the debris drain 26 is open for cleaning and there is no fluid passing through the pipeline strainer 10. Additionally, even if the pipeline strainer 10 is pressurized and fluid is present therein (although no flowing through), the cleaning tool 56 can be utilized to remove or loosen any debris from the straining element 14 and when the debris drain 26 is opened, the debris may flow out of the pipeline strainer 10 via the debris drain 26 along with fluid.

Furthermore, since the cleaning tool 56 is not rotated by flowing fluid through the pipeline strainer 10, less pressure drop may be realized since there is no need to impede the flow of fluid to utilize the energy associated with same. Notwithstanding the foregoing, it is contemplated that the cleaning tool 56 be allowed to be rotated by the passing fluids to allow some movement of the cleaning tool 56 and removal of debris in the straining element 14.

Returning to FIG. 1, as discussed above, the pipeline strainer 10 is typically disposed within conduits or piping. In order to secure the ends 20, 24 of the pipeline strainer 10 to the conduits or other piping, the first end 20 of the pipeline strainer 10 and the second end 24 of the pipeline strainer 10 may each include a flange 50, 52 extending outwardly away therefrom. The flanges 50, 52 may each include a plurality of apertures 54a, 54b, each sized to receive a fastener (not shown), such as a bolt or screw. The apertures 54a, 54b may also be configured to be in alignment with apertures on flanges on the conduits (not shown). In some embodiments of the present invention, at least one aperture 54b in the flanges 50, 52 of the pipeline strainer 10 comprises a threaded bore, and at least one aperture 54a is smooth. By smooth it is meant that the inner surface of the aperture 54a is not engaged by a threaded fastener extending there through. These fasteners are held in place by another item, such as a nut (not shown).

As discussed above, the various embodiments of the present invention provide a pipeline strainer that provides for the ability clean a straining element and dislodge debris therefrom without removing the straining element from the body of the pipeline strainer. Additionally, the various embodiments of the present invention allow for the cleaning tool to be operated when the pipeline strainer is in use (and fluids are flowing therethrough) and when the pipeline strainer is being cleaned (and no fluids are flowing therethrough).

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A pipeline strainer comprising:
   a body comprising an inlet for a fluid, an outlet for the fluid, a cavity inside of the body connecting the inlet and the outlet, a debris drain, and a longitudinal axis of the body extending from the inlet to the outlet;
   a straining element disposed in the cavity, the straining element having a first end, a second end opposite the first end, and a longitudinal axis extending from the first end to the second end;
   a cleaning tool comprising an inner portion within the body and an outer portion outside of the body, the cleaning tool further comprising at least one cleaning implement disposed inside of the cavity and coupled to an axle, the at least one cleaning implement configured to dislodge debris from an interior surface of the straining element; and,
   a seal disposed on a side of the body, wherein the axle extends through the seal and out of the body, and,
   wherein the seal includes a biased member configured to bias the cleaning tool in a direction parallel with the longitudinal axis of the straining element.

2. The pipeline strainer of claim 1 wherein the cleaning tool further comprises a handle connected to the axle.

3. The pipeline strainer of claim 2 wherein the handle is configured to rotate the axle.

4. The pipeline strainer of claim 3 wherein the at least one cleaning implement is mounted on an arm, and wherein the arm is connected to the axle.

5. The pipeline strainer of claim 3 further comprising a plurality of cleaning implements, each cleaning implement configured to dislodge debris from the straining element.

6. The pipeline strainer of claim 5 wherein each cleaning implement is mounted on an arm, and wherein the arms are each connected to the axle.

7. The pipeline strainer of claim 3 wherein the axle is coaxial with the longitudinal axis of the straining element.

8. A pipeline strainer comprising:
   a body comprising an inlet for a fluid, an outlet for the fluid, a cavity inside of the body connecting the inlet and the outlet, a debris drain, and a longitudinal axis of the body extending from the inlet to the outlet;
   a straining element disposed in the cavity, the straining element having a first end, a second end opposite the first end, and a longitudinal axis extending from the first end to the second end; and,
   a rotatable cleaning tool comprising a handle disposed outside of the body and a plurality of cleaning implement disposed inside of the cavity and being configured to be moved by the handle and to dislodge debris from an interior surface of the straining element, wherein each cleaning implement is mounted on an arm, and wherein the arms are each connected to an axle.

9. The pipeline strainer of claim 8 further comprising:
   a seal disposed on a side of the body, wherein the axle extends through the seal and out of the body.

10. The pipeline strainer of claim 9 wherein the seal includes a biased member configured to bias the cleaning tool in a direction along the longitudinal axis of the straining element.

11. A pipeline strainer comprising:
    a body comprising an inlet for a fluid, an outlet for the fluid, a cavity inside of the body connecting the inlet and the outlet, a debris drain, and a longitudinal axis of the body extending from the inlet to the outlet;
    a straining element disposed in the cavity, the straining element having a first end, a second end opposite the first end, and a longitudinal axis extending from the first end to the second end; and,
    a rotatable cleaning tool comprising a handle disposed outside of the body and a plurality of cleaning implements disposed inside of the cavity, each cleaning implement configured to dislodge debris from an interior surface of the straining element,
    wherein each cleaning implement is connected to an arm, and wherein the arms are connected to an axle movable by the handle.

12. The pipeline strainer of claim 11 wherein an angle between the longitudinal axis of the body and the longitudinal axis of the straining element is between 0 and 60°.

13. The pipeline strainer of claim 12 wherein the second end of the straining element is disposed proximate the debris drain.

14. The pipeline strainer of claim 13 wherein the axle is coaxial with the longitudinal axis of the straining element and wherein the debris drain is eccentric with the longitudinal axis of the straining element.

15. The pipeline strainer of claim 14 further comprising a seal disposed on a side of the body, wherein the axle extends through the seal and out of the body and wherein the seal includes a biased member configured to bias the cleaning tool in a direction along the longitudinal axis of the straining element.

* * * * *